(12) United States Patent
Breen et al.

(10) Patent No.: US 10,046,376 B2
(45) Date of Patent: *Aug. 14, 2018

(54) GUIDED KEEPER ASSEMBLY AND METHOD FOR METAL FORMING DIES

(71) Applicant: STANDARD LIFTERS, INC., Grand Rapids, MI (US)

(72) Inventors: Scott M. Breen, Marne, MI (US); Joel T. Pyper, Grand Rapids, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 301 days.

This patent is subject to a terminal disclaimer.

(21) Appl. No.: 14/981,995

(22) Filed: Dec. 29, 2015

(65) Prior Publication Data

US 2016/0107218 A1    Apr. 21, 2016

Related U.S. Application Data

(63) Continuation of application No. 13/397,912, filed on Feb. 16, 2012, now Pat. No. 9,248,491.

(60) Provisional application No. 61/444,887, filed on Feb. 21, 2011.

(51) Int. Cl.
| | |
|---|---|
| *B21D 37/14* | (2006.01) |
| *B21D 37/12* | (2006.01) |
| *B23P 15/24* | (2006.01) |

(52) U.S. Cl.
CPC ............ *B21D 37/14* (2013.01); *B21D 37/12* (2013.01); *B23P 15/24* (2013.01)

(58) Field of Classification Search
CPC ........ B21D 37/02; B21D 37/04; B21D 37/06; B21D 37/10; B21D 37/12; B21D 37/14; B21D 37/20; B30B 15/02; B30B 15/026; B30B 15/04; B30B 15/041; B30B 15/047; B30B 15/06; B23P 15/24
See application file for complete search history.

(56) References Cited

U.S. PATENT DOCUMENTS

| | | | |
|---|---|---|---|
| 2,346,297 | A | 4/1944 | Garbe |
| 2,487,233 | A | 11/1949 | Gerke |
| 2,627,313 | A | 2/1953 | Marsilius |
| 2,629,615 | A | 2/1953 | Marsilius |
| 2,663,180 | A | 12/1953 | Benedict |
| 2,979,004 | A | 4/1961 | Kenville et al. |
| 3,386,781 | A | 6/1968 | Blazek et al. |
| 3,474,656 | A | 10/1969 | Kraft |
| 3,514,166 | A | 5/1970 | Coley |
| 3,568,555 | A | 3/1971 | Stroh |
| 3,664,258 | A | 5/1972 | Vecchi |

(Continued)

*Primary Examiner* — R. K. Arundale
*Assistant Examiner* — Pradeep C Battula
(74) *Attorney, Agent, or Firm* — Price Heneveld LLP

(57) ABSTRACT

A guided keeper assembly and related method includes a cylindrical base that mounts to a die member using a multi-piece, interlocking flange. The flanges have outer fastener holes and inner arcuate walls that matingly engage a complimentary profile on the outer surface of the base to axially interconnect the same. The flanges also have male and female end connectors which snap lock together around the base in an assembled condition. Mounting screws pass through the fastener holes in the flanges and are anchored in the die member to securely retain the guided keeper assembly in place. A retainer ring is mounted in an associated groove in the base over the heads of the screws to prevent unintentional unfastening of the screws from the die member.

20 Claims, 7 Drawing Sheets

(56) References Cited

U.S. PATENT DOCUMENTS

| | | |
|---|---|---|
| 3,730,039 A | 5/1973 | Fedrigo |
| 3,897,118 A | 7/1975 | Wolfthal |
| 4,003,283 A | 1/1977 | Janiszewski |
| 4,080,819 A | 3/1978 | Hook et al. |
| 4,135,770 A | 1/1979 | Doherty et al. |
| 4,199,313 A | 4/1980 | Bohnenberger |
| 4,282,736 A | 8/1981 | Mashburn |
| 4,326,402 A | 4/1982 | Wallis |
| 4,483,173 A | 11/1984 | Duhamel |
| 4,696,180 A | 9/1987 | Zandel |
| 4,732,033 A | 3/1988 | Smedberg et al. |
| 4,742,746 A | 5/1988 | Olsson |
| 4,765,227 A | 8/1988 | Balazs et al. |
| 4,796,460 A | 1/1989 | Smedberg et al. |
| 4,836,071 A | 6/1989 | Ersoy |
| 5,113,736 A | 5/1992 | Meyerle |
| 5,243,743 A | 9/1993 | Peterson |
| 5,245,904 A | 9/1993 | Meyerle |
| 5,722,280 A | 3/1998 | Bodnar |
| 5,775,212 A | 7/1998 | Takao |
| 5,788,903 A | 8/1998 | Allgaier |
| 5,974,852 A | 11/1999 | Nieschulz |
| 6,408,728 B1 | 6/2002 | Tsuji et al. |
| 6,848,290 B2 | 2/2005 | Pyper et al. |
| 6,895,797 B2 | 5/2005 | Lowry et al. |
| 6,925,922 B2 | 8/2005 | Manabe et al. |
| 6,986,273 B2 | 1/2006 | Rager |
| 7,000,446 B2 | 2/2006 | Nieschulz et al. |
| 7,004,007 B2 | 2/2006 | Kruger et al. |
| 7,114,365 B2 | 10/2006 | Rooney, Jr. et al. |
| 7,152,451 B1 | 12/2006 | Cotter |
| 7,730,757 B2 | 6/2010 | Pyper et al. |
| 7,861,569 B2 | 1/2011 | Cotter et al. |
| 7,950,262 B2 | 5/2011 | Pyper et al. |
| 2002/0124706 A1 | 9/2002 | Mochizuki |
| 2005/0045786 A1 | 3/2005 | Tupper et al. |
| 2005/0095062 A1 | 5/2005 | Iverson et al. |
| 2007/0037434 A1 | 2/2007 | Fedder et al. |
| 2008/0295315 A1 | 12/2008 | Horng |
| 2009/0193865 A1 | 8/2009 | Pyper et al. |
| 2009/0308242 A1 | 12/2009 | Choi et al. |
| 2009/0309324 A1 | 12/2009 | Comunello |

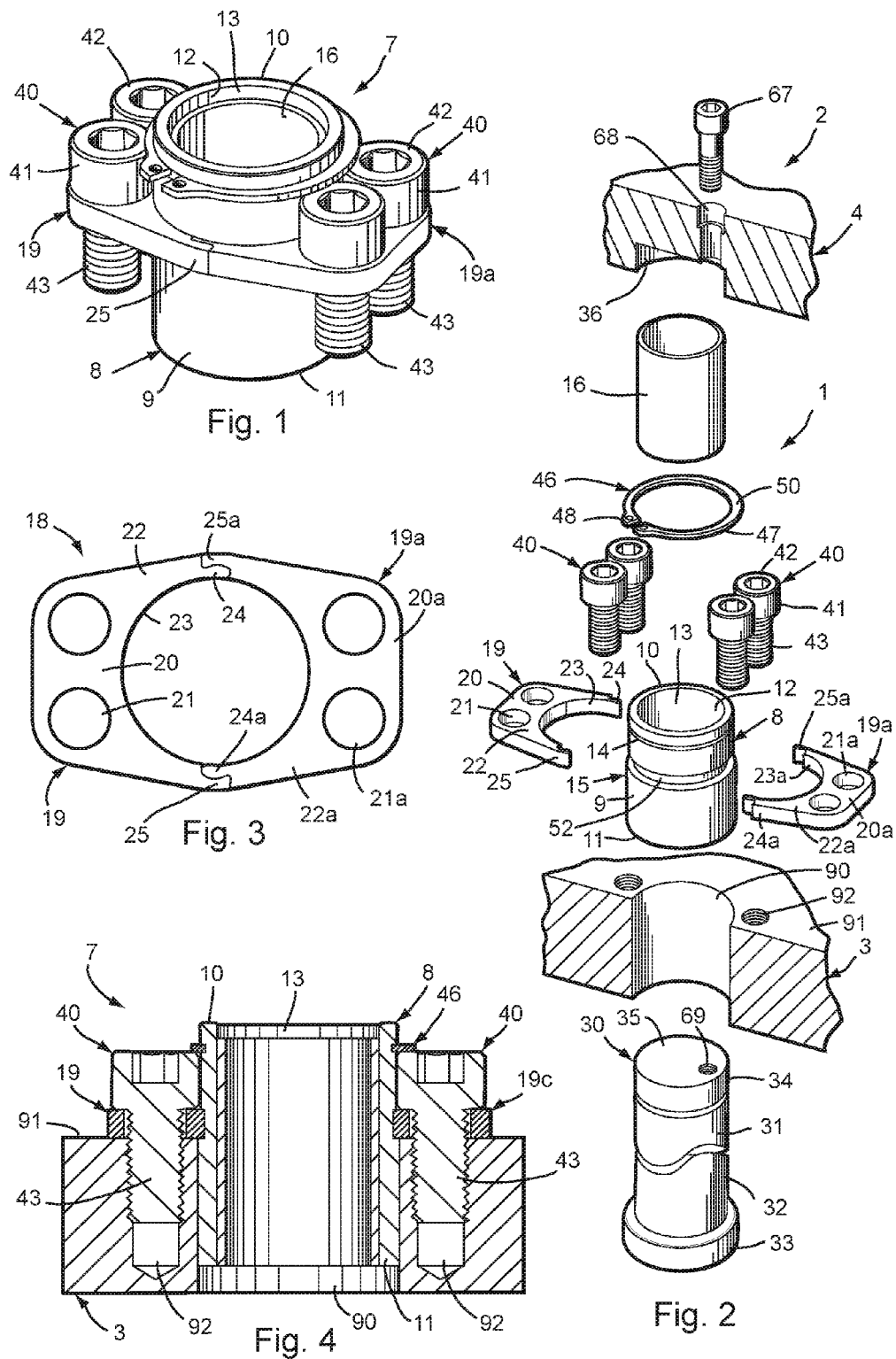

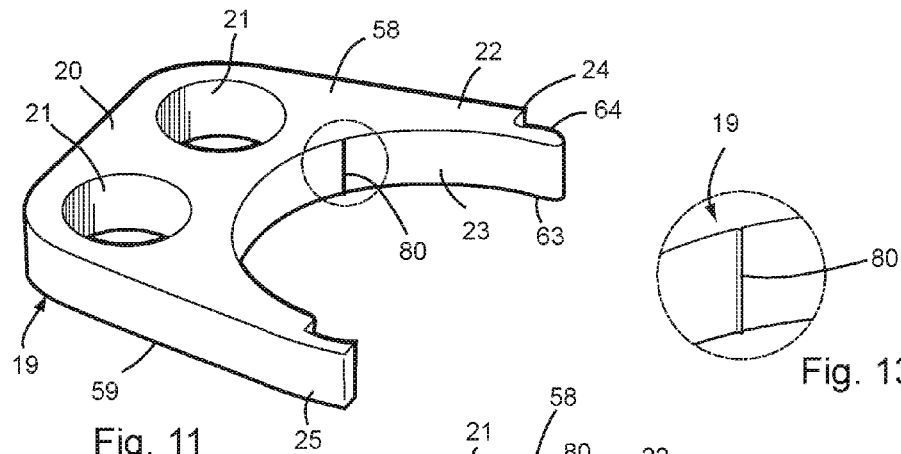
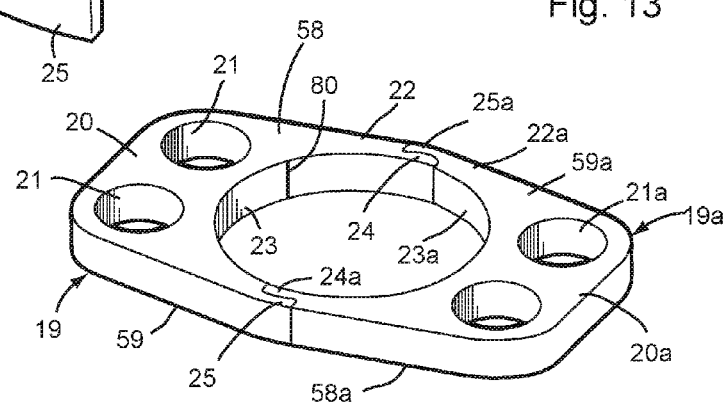
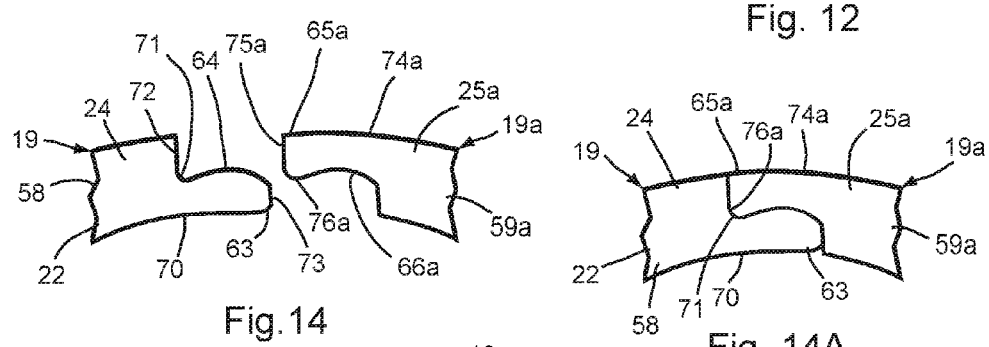
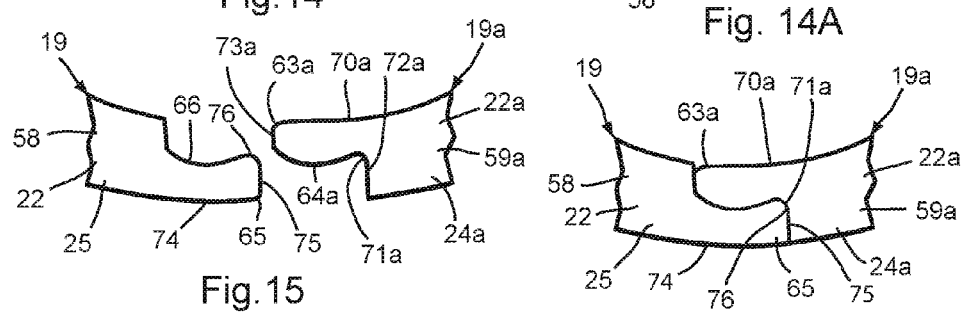

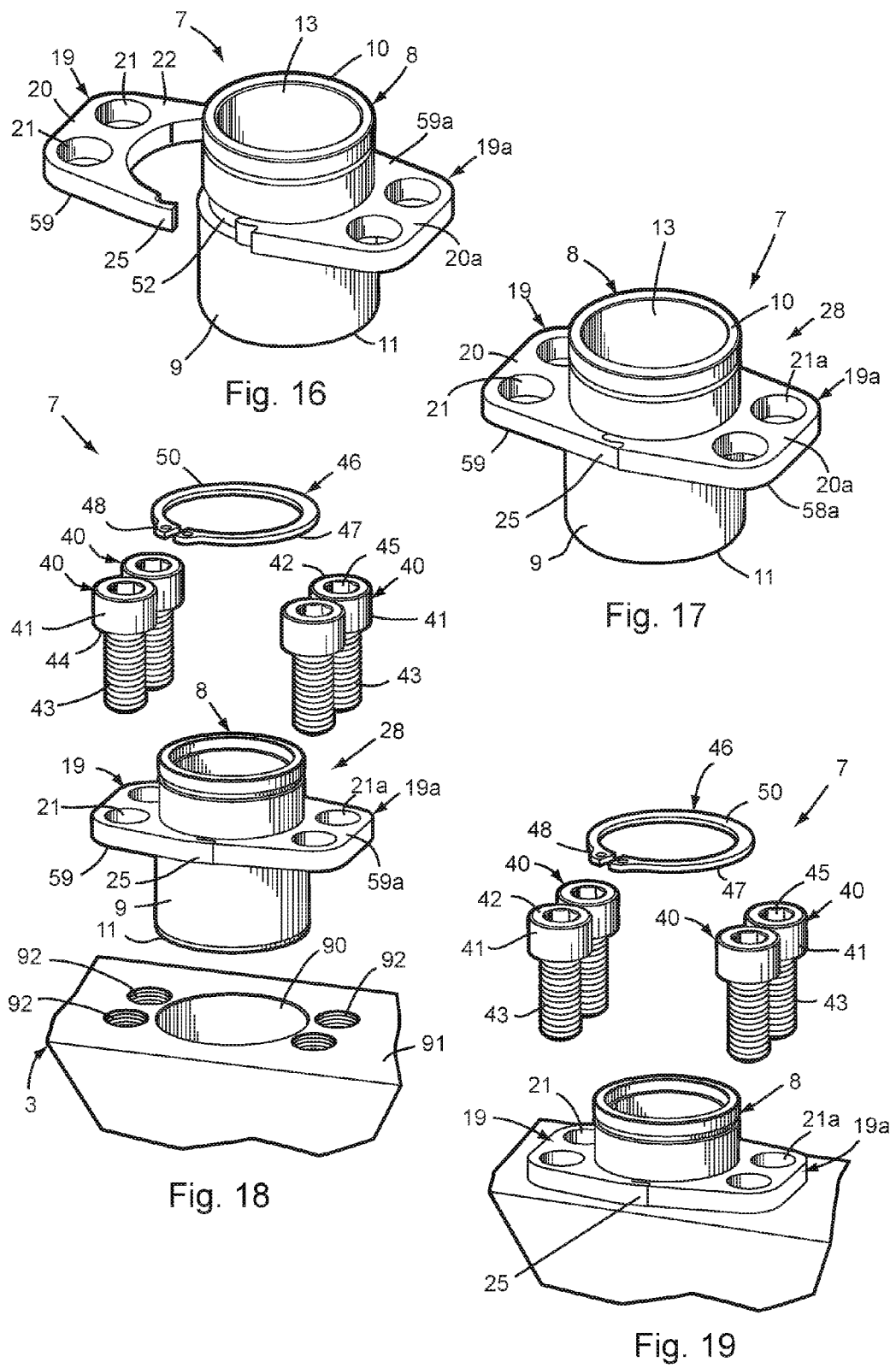

GUIDED KEEPER ASSEMBLY AND METHOD FOR METAL FORMING DIES

CROSS REFERENCE TO RELATED APPLICATION

The present application is a continuation of and claims priority under 35 U.S.C. § 120 to commonly assigned U.S. application Ser. No. 13/397,912, filed Feb. 16, 2012, now U.S. Pat. No. 9,248,491, issued Feb. 2, 2016, entitled GUIDED KEEPER ASSEMBLY AND METHOD FOR METAL FORMING DIES, which claims the priority benefit under 35 U.S.C. § 119, basing said claim of priority on related provisional patent U.S. Application No. 61/444,887 filed Feb. 21, 2011, both of which are incorporated hereby by reference.

BACKGROUND OF THE INVENTION

The present invention relates to metal forming dies, and particularly to a guided keeper assembly and associated methods.

Metal forming dies, such as stamping dies and the like are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming presses have typically been individually designed, one of a kind assemblies for a particular part, with each of the various components being handcrafted and custom mounted or fitted in an associated die set, which is in turn positioned in a stamping press. Not only are the punches and other forming tools in the die set individually designed and constructed, but the other parts of the die set, such as stock lifters, guides, end caps and keepers, cam returns, etc., are also custom designed and individually installed in the die set. Current die making processes require careful machining, precision holes and recesses in the die set for mounting the individual components, such that the same are quite labor intensive, and require substantial lead time to make, test and set up in a stamping press. Consequently, such metal forming dies are very expensive to design, manufacture and repair or modify.

A modular guided keeper having a base with snap on mounting flanges which both precisely aligns the two die members, and positively limits the reciprocal travel therebetween would be clearly advantageous in simplifying metal forming die constructions and reducing the costs in designing, manufacturing and repairing the same. Positive retention of the base using snap-on flanges on an associated die member is important to ensure that the same does not loosen and cause damage to the die set and/or press, which would result in expensive repair and machine downtime.

SUMMARY OF THE INVENTION

One aspect of the present invention is a metal forming die having first and second die members mounted a spaced apart distance for reciprocation between converged and diverged positions, along with an improved guided keeper assembly. The guided keeper assembly includes a base having a generally cylindrically shaped rigid body with an outside wall portion, first and second oppositely disposed end portions, and a central portion with a central aperture extending axially therethrough. The base also has a retainer ring groove in the outside wall portion, which is disposed axially between the first and second end portions. The base also includes a first connector profile on the outside wall portion which is disposed axially between the second end portion and the second retainer ring groove. The guided keeper assembly also includes a two-piece, interlocking mounting flange which includes a first flange member having a first mounting portion, at least one first through hole disposed generally perpendicular to the first mounting portion for attaching the first flange member to the first die member, an arcuate inside wall portion with a second connector profile which matingly engages at least a portion of the first connector profile on the outside wall portion of the base and axially interconnects the base with the first flange member, as well as first and second end connectors. The two piece interlocking flange also includes a second flange member having a second mounting portion, at least one second through hole disposed generally perpendicular to the second mounting portion for attaching the second flange member to the first die member, an arcuate inside wall portion with a third connector profile which matingly engages at least a portion of the first connector profile on the outside wall portion of the base and axially interconnects the base and the second flange member, as well as third and fourth end connectors which securely, yet detachably, lock with the first and second end connectors on the first flange member to laterally interconnect the first and second flange members with and about the base in an assembled condition to facilitate installing the same in the first die member. The guided keeper assembly also includes a guide pin having a cylindrically shaped central body portion closely received in the central aperture in the base for precisely guiding reciprocal motion between the first and second die members. The guide pin has a first end with an enlarged head shaped to abut the base to positively limit travel between the first and second die members, and a second end disposed generally opposite the first end, and having a locator portion that engages the second die member, and precisely locates the second end of the guide pin on the second die member. The guided keeper assembly also includes first and second mounting screws having enlarged head portions with exterior end faces, and threaded shank portions extending through the first and second through holes in the first and second flange members, and being detachably anchored in the first die member. The guided keeper assembly also includes a retainer ring detachably received and securely retained in the retainer ring groove in the base, and having an interior face disposed over at least a portion of the exterior end faces of the enlarged head portions of the first and second mounting screws, whereby engagement between the exterior end faces of the head portions of the first and second mounting screws and the interior face of the retaining ring positively prevents the first and second mounting screws from unintentionally unfastening from the first die member.

Another aspect of the present invention is a guided keeper assembly for a metal forming die having first and second die members mounted a spaced apart distance for reciprocation between converged and diverged positions. The guided keeper assembly includes a base having a generally cylindrically shaped, rigid body with an outside wall portion, first and second oppositely disposed end portions, and a central portion with a central aperture extending radially therethrough. The base includes a retainer ring groove in the outside wall portion which is disposed axially between the first and second end portions, as well as a first connector profile on the outside wall portion which is disposed axially between the second end portion and the retainer ring groove. The guided keeper assembly also includes a two-pieced interlocking mounting flange, which includes a first flange member having a first mounting portion, at least one of first through holes disposed perpendicularly to the first mounting portion for attaching the first flange member to the first die member, an arcuate inside wall portion with a second connector profile which matingly engages at least a portion of the first connector profile on the outside wall portion of the base, and axially interconnects the base with the first flange member, as well as first and second end connectors. The interlocking mounting flange also includes a second flange member having a second mounting portion, at least one second through hole disposed generally perpendicular to the second mounting portion for attaching the second flange member to the first die member, an arcuate inside wall portion with a third connector profile which matingly engages at least a portion of the first connector profile on the outside wall portion of the base and axially interconnects the base and the second flange member, as well as third and fourth end connectors which securely, yet detachably lock with the first and second end connectors on the first flange member to laterally interconnect the first and second flange members with and about the base in an assembled condition to facilitate installing the same in the first die member. The guided keeper assembly also includes a guide pin having a cylindrically shaped central portion closely received in the central aperture in the base for precisely guiding reciprocal motion between the first and second die members, along with a first end having an enlarged head shaped to abut the base to positively limit travel between the first and second die members, and a second end position generally opposite the first end, and having a locator portion that engages the second die member, and precisely locates the second end of the guide pin on the second die member. The guided keeper assembly also includes first and second mounting screws having enlarged head portions with exterior end faces, and threaded shank portions extending through the first and second through holes in the first and second flange members, and being adapted for detachable anchoring in the first die member. The guided keeper assembly also includes a retainer ring detachably received and securely retained in the retainer ring groove in the base, and having an interior face disposed over at least a portion of the exterior end faces of the enlarged head portions of the first and second mounting screws, whereby engagement between the exterior end faces of the head portions of the first and second mounting screws and the interior face of the retaining ring positively prevents the first and second mounting screws from unintentionally unfastening from the die member.

Yet another aspect of the present invention is a method for making a metal forming die having first and second die members mounted a spaced apart distance for reciprocation between converging and diverging positions using a guided keeper assembly. The method includes forming a base member with a generally cylindrically shaped rigid body with an outside wall portion, first and second oppositely disposed end portions, and a central portion with a central aperture extending axially therethrough. The method also includes forming a retainer ring groove in the outside wall portion at a location disposed axially between the first and second end portions, and forming a first connector profile on the outside wall portion at a location disposed axially between the second end portion and the retainer ring groove. The method also includes forming a two-piece interlocking mounting flange that includes forming a first flange member with a first mounting portion, at least one first through hole disposed generally perpendicular to the first mounting portion for attaching the first flange member to the first die member, an arcuate inside wall portion with a second connector profile which is shaped for matingly engaging at least a portion of the first connector profile on the outside wall portion of the base, as well as first and second end connectors. The mounting flange forming step also includes forming a second flange member, with a second mounting portion, at least one second through hole disposed generally perpendicular to the second mounting portion for attaching the second flange member to the first die member, an arcuate inside wall portion with a third connector profile which is shaped for matingly engaging at least a portion of the first connector profile on the outside wall portion of the base, as well as third and fourth end connectors. The method also includes forming a guide pin with a cylindrically shaped central portion shaped for close reception in the central aperture in the base for precisely guiding reciprocal motion between the first and second die members, a first end with an enlarged head shaped to abut the base to positively limit travel between the first and second die members, and a second end, positioned generally opposite the first end, with a locator portion that engages the second die member. The method also includes forming a non-threaded base aperture in the first die member shaped to closely receive the second end portion of the base therein, as well as forming first and second threaded retainer apertures in the first die member in a laterally spaced apart relationship on opposite sides of the base aperture. The method further includes providing first and second mounting screws having enlarged head portions with exterior end faces, and threaded shank portions shaped to extend through the first and second through holes in the first and second flange members. The method also includes providing a retainer ring shaped for close reception in the retainer ring groove in the base, and having an exterior face. The method further includes positioning the second connector profile on the arcuate inside wall portion of the first flange member abuttingly against an adjacent portion of the first connector profile on the base, and positioning the third connector profile in the arcuate inside wall portion of the second flange member abuttingly against an adjacent portion of the first connector profile on the base at a location generally diametrically opposite the second connector profile on the first flange member. The method further includes radially converging the first and second flange members about the base until the first, second, third and fourth end connectors snap lock together, thereby axially interconnecting the base with the first and second flange members in an assembled condition to define a base subassembly that facilitates installing the same on the first die member. The method further includes positioning the base subassembly on the first die member with the second end portion of the base closely received in the base aperture in the first die member, and with the first and second through holes in the first and second flange members aligned with the first and second threaded retainer apertures. The method further includes inserting the threaded shank portions of the first and second mounting screws through the first and second through holes in the first and second flange members and into the first and second threaded retainer apertures in the first die member and rotating the same to a tightened condition, whereby the base subassembly is securely, yet detachably connected with the first die member. The method further includes inserting the retaining ring into the retainer ring groove in the base with the exterior face of the retainer ring disposed over at least a portion of the exterior end faces of the head portions of the first and second mounting screws, whereby engagement between the exterior end faces of the head portions of the first and second mounting screws and the interior face of the retaining ring positively prevents the first and second mounting screws from unintentionally unfastening from the first die member. The method further includes inserting the central portion of the guide pin into the central aperture in the base for precisely guiding reciprocal motion between the first and second die members, and connecting the second end of the guide pin with the second die member.

Yet another aspect of the present invention is the guided keeper assembly having a base with snap-on mounting flanges, which incorporates a very uncomplicated, cost effective design that uses few different parts and therefore requires less processing and fabrication time and expense. The base with unique two piece interlocking mounting flange has a low profile, as well as a small plan footprint which permits use of the guided keeper assembly at a wide variety of different locations in any associated die member. The unique base assembly requires only simple machining to fabricate, yet provides secure retention on a mounting surface. Preferably, each of the mounting flange pieces which snap together about the base have an identical size and shape, and are operably interchangeable to minimize production and inventory costs. Each of the interlocking flange members can be cut from a single plate of material such as steel or the like by laser cutting or abrasive jet cutting, and snap together easily about the associated base, so that there are no loose parts when the base assembly is mounted in an associated die. Preferably, anti-rotation profiles are provided in the inner ends of the interlocking flange members, which prevent rotation between the base and the flange members. The guided keeper base assembly is simple and requires no special tooling, and is easy to remove and replace when necessary. The guided keeper assembly and associated base with interlocking snap-on mounting flanges is efficient in use, economical to manufacture, capable of a long operating life, and particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 1 is a perspective view of a base assembly portion of a guided keeper assembly embodying the present invention, shown in an assembled condition.

FIG. 2 is an exploded perspective view of a guided keeper assembly embodying the present invention.

FIG. 3 is a plan view of a pair of flange members interconnected for supporting a base portion of the guided keeper assembly.

FIG. 4 is a vertical cross-sectional view of the base assembly shown in FIG. 1, shown installed in a die member.

FIG. 11 is a perspective view of a base flange member portion of the guided keeper assembly.

FIG. 12 is a perspective view of two base flange members, shown snap-locked together in an assembled condition.

FIG. 13 is an enlarged fragmentary plan view of an interior edge portion of the base flange with an anti-rotation profile thereon.

FIG. 14 is an enlarged plan view of first and third end connectors on first and second flange members, shown in a disassembled condition.

FIG. 14A is an enlarged fragmentary plan view of the first and third end connectors of FIG. 14, shown snapped together in an assembled condition.

FIG. 15 is an enlarged plan view of second and fourth end connectors on first and second flange members, shown in a disassembled condition.

FIG. 15A is an enlarged fragmentary plan view of the second and fourth end connectors of FIG. 14 shown in a snapped together assembled condition.

FIG. 16 is a perspective view of the base, shown in a partially assembled condition.

FIG. 17 is a perspective view of the base, shown in a fully assembled condition.

FIG. 18 is an exploded perspective view of the base, shown with a portion of a die member to which the base is to be assembled.

FIG. 19 is a perspective view of the base and die member shown in FIG. 18, wherein the base body and mounting flange subassembly has been positioned in the die member.

DETAILED DESCRIPTION

Figure 5:
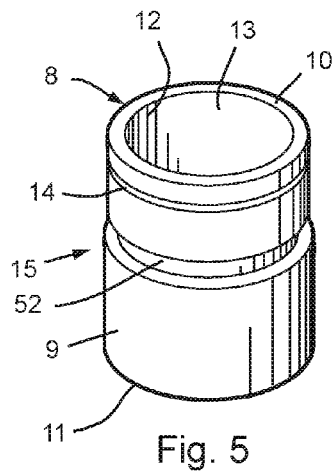
FIG. 5 is a perspective view of a base body portion of the guided keeper assembly.

For purposes of description herein, the terms "upper," "lower," "right," "left," "rear," "front," "vertical," "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 2) generally designates a guided keeper assembly that is particularly adapted for use in conjunction with metal forming dies, such as the schematically illustrated metal forming die 2 shown in FIG. 2, which has first and second die members 3 and 4, respectively, that are mounted a spaced apart distance for reciprocation between converged and diverged positions. The guided keeper assembly 1 includes a base assembly 7 having a generally cylindrically shaped, rigid base body 8 with an outside wall portion 9, first and second oppositely disposed end portions 10 and 11, and a central portion 12 with a central aperture 13 extending axially therethrough. Base body 8 has a retainer ring groove 14 in the outside wall portion 9 that is disposed axially between the first and second end portion 10 and 11 of base 7. Base body 8 also includes a first connector profile 15 on the outside wall portion 9 of base body 8 which is disposed axially between the second end portion 11 of base 7 and the retainer ring groove 14.

In the example illustrated in FIGS. 1-4, base assembly 7 also includes a two piece, interlocking mounting flange assembly 18 (FIG. 3), which includes a first flange member 19 having a first mounting portion 20, and at least one first through hole 21 disposed generally perpendicular to the first mounting portion 20 for attaching the first flange member 19 to the first die member 3, an arcuate inside portion 22 with a second connector profile 23, which matingly engages at least a portion of the first connector profile 15 on the outside wall portion 9 of base body 8 and axially interconnects base body 8 and the first flange member 19, as well as first and second end connectors 24 and 25, respectively.

Mounting flange assembly 18 further includes a second flange member, which in the illustrated example, is substantially identical in size and shape to that of the first flange member 19, such that they are operably interchangeable to minimize production and inventory costs. Consequently, the similar areas and portions of the first and second flange members are represented by the same, corresponding reference numerals, except for the suffix "a" in the numerals of the last. Hence, the second flange member 19a also has a mounting portion 20a, at least one through hole 21a disposed generally perpendicular to the mounting portion 20a for attaching the second flange member 19a to the first die member 3, an arcuate inside wall portion 22a with a connector profile 23a, which matingly engages at least a portion of the first connector profile 15, on the outer wall portion 9 of base body 8 and axially interconnects the base body 8 and the second flange member 19a, as well as end connectors 24a and 25a which securely, yet detachably lock with the first and second end connectors 24 and 25 on the first flange member 19 to laterally interconnect the first and second flange members 19, 19a, with and about the base body 7 in an assembled condition, as shown in FIGS. 1 and 4, to facilitate installing the same in the first die member 3.

The guided keeper assembly 1 also includes a guide pin 30 (FIG. 2) having a cylindrically shaped central portion 31 closely received in the central aperture 13 in base body 8 for precisely guiding reciprocal motion between the first and second die members 3, 4. Guide pin 30 also has a first end portion 32 with an enlarged head 33 shaped to abut base body 8 to positively limit travel between the first and second die members 3, 4, and a second end portion 34, positioned generally opposite the first end portion 32, and having a locator portion 35 that engages the second die member 4, and precisely locates the second end portion 34 of the guide pin 30 on the second die member 4. In the example shown in FIG. 2, the second die member 4 includes a downwardly opening socket 36 in which the locator portion of guide pin 30 is closely received. A threaded retainer screw 67 extends through a non-threaded aperture 68 in die member 4, as well as socket 36, and is anchored in a threaded aperture 69 in the second end 34 of guide pin 3 to securely, yet detachably, connect the second end 34 of guide pin 30 to the second die member 4.

The base assembly 7 also includes at least two mounting screws 40 (FIGS. 1-4) having enlarged head portions 41 with exterior end faces 42, and threaded shank portions 43 that extend through the first and second through holes 21, 21a in the first and second flange members 19, 19a and are adapted for threaded anchoring in the first die member 3. The base assembly 7 also includes a retainer ring 46 that is detachably received and securely retained in the retainer ring groove 14 in base 7, and has an interior face 47 disposed over at least a portion of the exterior end faces 42 of the enlarged head portions 41 of the mounting screws 40, as shown in FIGS. 1 and 4, whereby engagement between the exterior end faces 42 of the head portions 41 of the mounting screws 40 and the interior face 47 of the retaining ring 46 positively prevents the mounting screws 40 from unintentionally unfastening from the first die member 3.

Figure 6:
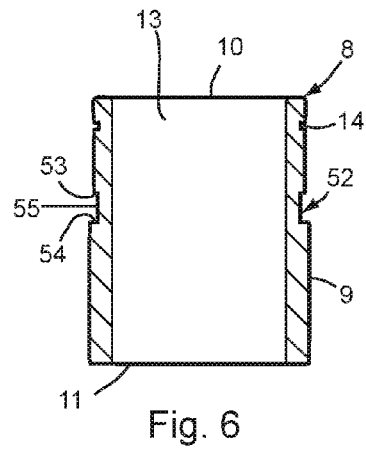
FIG. 6 is a vertical cross-sectional view of the base body.

In the examples illustrated herein, the first connector profile 15 on base body 8 comprises an annularly shaped attachment groove 52 (FIGS. 5-7) which is oriented generally perpendicular to the central axis of base body aperture 13, opens radially outwardly, and is defined by first and second radially oriented mutually parallel sidewalls 53 and 54 which are spaced axially apart a predetermined distance, and an axially oriented interior end wall 55 which is disposed generally perpendicular to the first and second sidewalls 53 and 54, and extends axially therebetween. The illustrated attachment groove 52 is located approximately midway along the length of base body 8, while the illustrated retainer ring groove 14 is located adjacent to the outer end 10 of base body 8.

Figure 7:
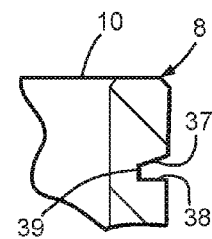
FIG. 7 is an enlarged fragmentary cross-sectional view of a retaining ring groove portion of the base body.

As best illustrated in FIG. 7, the outwardly most sidewall 37 of the retainer ring groove 14 in base body 8 has a tapered shape which resiliently urges the interior face 47 of the retainer ring 46 abuttingly against the exterior end faces 42 of the head portion 41 of the mounting screws 40. As best illustrated in FIG. 7, the outer sidewall 37 of retainer ring groove 14 angles away from the outward end 10 of base body 8. The innermost sidewall 38 of retainer ring groove 14 is flat and oriented generally perpendicular to the central axis of base body aperture 13, while the end wall 37 is oriented generally parallel therewith. In the illustrated example, base body 8 has a solid one piece construction, and may be lathe machined from a single length of steel bar stock material using inexpensive two-dimensional lathe techniques, instead of expensive live tooling. Also, in the illustrated example, an anti-friction bushing 16 (FIGS. 1-3) is mounted in the central aperture 12 of the base body 8 and slidingly receives therein the central portion 31 of guide pin 30.

Figure 8:
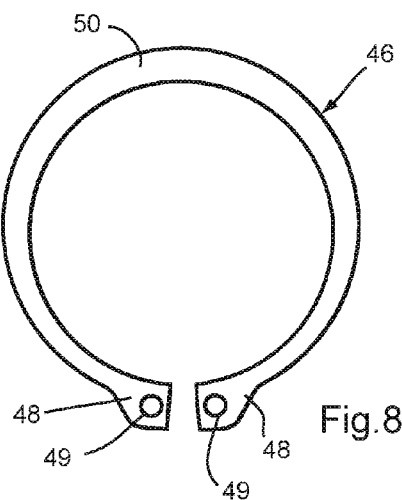
FIG. 8 is a plan view of a retainer ring portion of the guided keeper assembly.
Figure 6A:
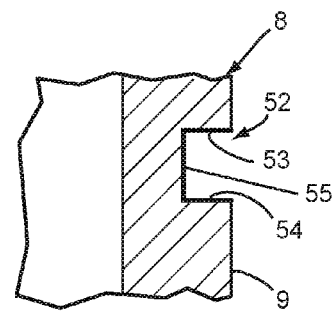
FIG. 6A is an enlarged fragmentary cross-sectional view of an attachment groove portion of the base body.
Figure 9:
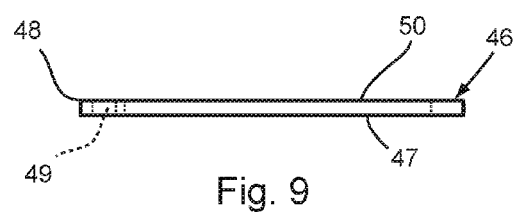
FIG. 9 is a side elevational view of the retainer ring.

The illustrated retainer ring 46 (FIGS. 8 and 9) has a conventional split, snap ring construction with enlarged ends 43 having through openings 49 to receive a tool therein for mounting and unmounting retainer ring 46 in retainer ring groove 14. The interior face 47 of retainer ring 46 is generally flat and parallel with the exterior face 50.

Figure 10:
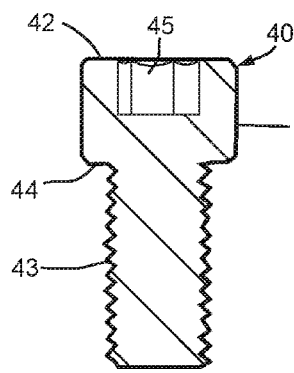
FIG. 10 is a longitudinal cross-sectional view of a mounting screw portion of the guided keeper assembly.

With reference to FIG. 10, the illustrated mounting screws 40 comprise conventional socket head cap screws, wherein the enlarged heads 41 are cylindrical in shape, and include a central socket 45 in the exterior end faces 42 in which a tool is received to tighten and loosen mounting screws 40 when retainer ring 46 is removed from base body 8. The interior end faces 44 of mounting screws 40 are flat and generally parallel with the exterior end faces 42.

In the illustrated examples, the first and second flange members 19, 19a comprise side contoured, generally flat plates, which as best illustrated in FIGS. 11-15A, have a yoke shaped plan profile, with mutually parallel first and second faces 58 & 59, and 58a & 59a, and include the outer mounting portions 20, 20a in which the through holes 21, 21a are disposed, and generally U-shaped inner end portions 22, 22a with generally semi-circularly shaped end edges 23, 23a for close reception in adjacent portions of the attachment groove 52 in base 7, thereby defining the second and third connector profiles.

As noted above, all of the illustrated flange members 19, 19a are identical in shape and size, and are preferably made from the same die or other cutting machine pattern, thereby greatly reducing production and inventory costs. When assembling any given base assembly 7, one base body 8 and two flange members 19, 19a are selected. One of the two flange members, such as the left flange member 19 in FIG. 12, has its outer face 58 oriented toward the outer end 10 of base body 9, and its opposite face 59 oriented toward the inner end 11 of base body 9. The other of the two flange members, such as the right flange member 19a in FIG. 12, has its outer face 59a oriented toward the outer end 10 of base body 9, and its opposite face 58a oriented toward the inner end 11 of base body 9. Consequently, flange member 19 is identical in shape and size to flange member 19a, with the only difference being that the orientations of the faces 58 & 59 and 58a & 59a is reversed to create a pair of flange members 19 and 19a which snap lock together about base body 8.

As best illustrated in FIGS. 14-15a, the first end connector 24 is disposed on one of the arms of flange member 19 adjacent a first terminal portion of the inner end portion 22 thereof, and has a first finger 63 which protrudes circumferentially outwardly therefrom, with a first contoured surface 64 that faces in a first radial direction. The third end connector 25a is disposed on a related one of the arms of the second flange member 19a, adjacent a first terminal portion of the inner end portion 22 thereof, and has a second finger 65a which protrudes circumferentially outwardly therefrom, with a third contoured surface 66a that mates with the first contoured surface 64 on the first finger 63 on the first end connector 24 and faces in a second radial direction that is radially opposite from the first radial direction, whereby convergence of the first and third end connectors 24, 25a cause the first and third end connectors 24, 25a to snap lock together in a self-locking relationship.

Referring again to FIGS. 14-15a, the second end connector 25 on the first flange member 19 is disposed on the other one of the flange arms, opposite the first end connector 24 at a location adjacent to a terminal portion of the inner end portion 22 thereof, and has a finger 65 which protrudes circumferentially outwardly therefrom, with a second contoured surface 66 that faces in a first radial direction. The fourth end connector 24a on the other one of the arms of the second flange member 19a is disposed opposite the third end connector 25a, adjacent a terminal portion of the inner end portion 22 of the second flange member 19a, and has a fourth finger portion 63a which protrudes circumferentially outwardly therefrom, with a fourth contoured surface 64a that mates with the second contoured surface 66 on the second finger 65 of the second end connector 25 and faces in a second radial direction that is radially opposite from the first direction, whereby convergence of the second and fourth end connectors 25, 24a causes the second and fourth end connectors 25, 24a to snap together in a self-locking relationship. In the example best shown in FIGS. 3 and 12-17, the first contoured surface 64 of first finger 63 on the first end connector member 24 of the first flange member 19 faces radially outwardly, while the third contoured surface 66a on the third finger 65a on the third end connector 25a on the second flange member 19a faces radially inwardly. Further, in the example best shown in FIGS. 3 and 12-17, the second contoured surface 66 on the second finger 65 on the second end connector member 25 of the first flange member 19 faces radially inwardly, while the fourth contoured surface 64a on the fourth finger 63a on the fourth end connector 24a on the second flange member 19a faces radially outwardly.

In the example illustrated in FIGS. 11-17, end connectors 25 and 25a comprise male shaped end connectors, and end connectors 24 and 24a comprise female shaped end connectors that are configured to lockingly mate with the male end connectors 25 and 25a. More specifically, the female end connectors 24, 24a have radially oriented inward sides 70, 70a with a generally arcuate shape that extends along a radius of curvature that is substantially equal to the radius of curvature of the interior end wall 55 of the attachment groove 52 in base body 8. In contrast, the radially oriented outward sides 64, 64a of the female end connectors 24, 24a extends along a radius of curvature that is substantially less than the radius of curvature of the inside walls 70, 70a thereby forming radially inwardly extending pockets 71, 71a at the interior ends 72, 72a thereof. Generally rounded tips 73, 73a extend between the inward sides 70, 70a and the outward sides 64, 64a of the female end connectors 24, 24a. The male end connectors 25, 25a have radially oriented outward sides 74, 74a which, in the illustrated example, extend along a radius of curvature that is slightly larger than the radius of curvature of the outside wall portion 9 of base body 8. The radially oriented inward sides 66, 66a of the male end connectors 25, 25a have a generally arcuate shape that extends along a radius of curvature that is substantially identical to the radius of curvature of the outward sides 64, 64a of the female end connectors 24, 24a and nests tightly therein. The male end connectors 25, 25a also have tips 75, 75a which extend between the inward sides 66, 66a and outward sides 74, 74a and include radially inwardly protruding arcuate edges 76, 76a that are configured similar to the pockets 71, 71a in the female end connectors 24, 24a and snap lock into the pockets 71, 71a in the female end connectors 24, 24a to securely, yet detachably, interconnect the first and second flange members 19 and 19a.

In summary, all of the illustrated flange members, such as flange member 19, are identical in shape and size, with a yoke shaped inner portion 22 that has a female end connector 24 on the end of one flange arm, and a mating male end connector 25 on the end of the other flange arm. Each female end connector 24 has a radially inwardly positioned finger 63, with larger arcuate radially inwardly facing side 70 that is closely received in the attachment groove 52 of base body 8, and a smaller arcuate radially outwardly facing side 64 that snap locks into a mating portion of a male end connector on the flange arm of an adjacent flange member, such as surface 66a on the male end connector 25 on flange member 19a. Each male end connector 25 has a radially outwardly positioned finger 65 that overlies the adjacent female finger 63 in the assembled condition, with a radially inwardly projecting and edge 76 that snap locks into a mating pocket 71 in the associated female end connector 24. Each base assembly 7 has one base body 8 and two flange members which are paired together by reversing the orientation of one of the flange members 19a relative to the other flange member 19, such that the male and female end connectors 24, 25 on one flange member 19 align with the female and male end connectors 25a and 24a, respectively, on the other flange member 19a.

Preferably, each flange member 7 is cut from a flat plate of metal or the like, such that all cut side edges are exactly perpendicular to the opposite faces 58 and 59 of the flange plate 57. Laser cutting, abrasive water jet cutting, or other similar techniques can be used to quickly, easily and accurately form a large quantity of identical flange members 19 from one or more sheets of rigid material, including steel, and the like.

Referring again to FIGS. 11-17, the end edges 23, 23a on the first and second flange members 19, 19a include a plurality of axially extending, anti-rotation profiles 80 that abuttingly engage at least one of the interior end wall 55 and/or sidewalls 53, 54 of the retainer ring groove 52, and prevent rotation between the base body 8 and the first and second flange members 19, 19a. In the illustrated example, each of the anti-rotation profiles in the form of notches in the end edges 23, 23a of the first and second flange members 19, 19a having a generally V-shaped plan configuration, which extend radially outwardly to the base of the V-shape. The V-shaped anti-rotation notches are preferably spaced apart circumferentially along the semi-circular interior end edges 62, 62a of flange members 19, 19a.

With reference to FIGS. 1-2, each of the illustrated first and second flange members 19, 19a includes two through holes 21, 21a located in the mounting portions 20, 20a of the flange members 19, 19a. Each pair of through holes 21, 21a is positioned in a laterally spaced apart and aligned relationship and is configured to receive therethrough one of the mounting screws 40.

Figures 20, 21:
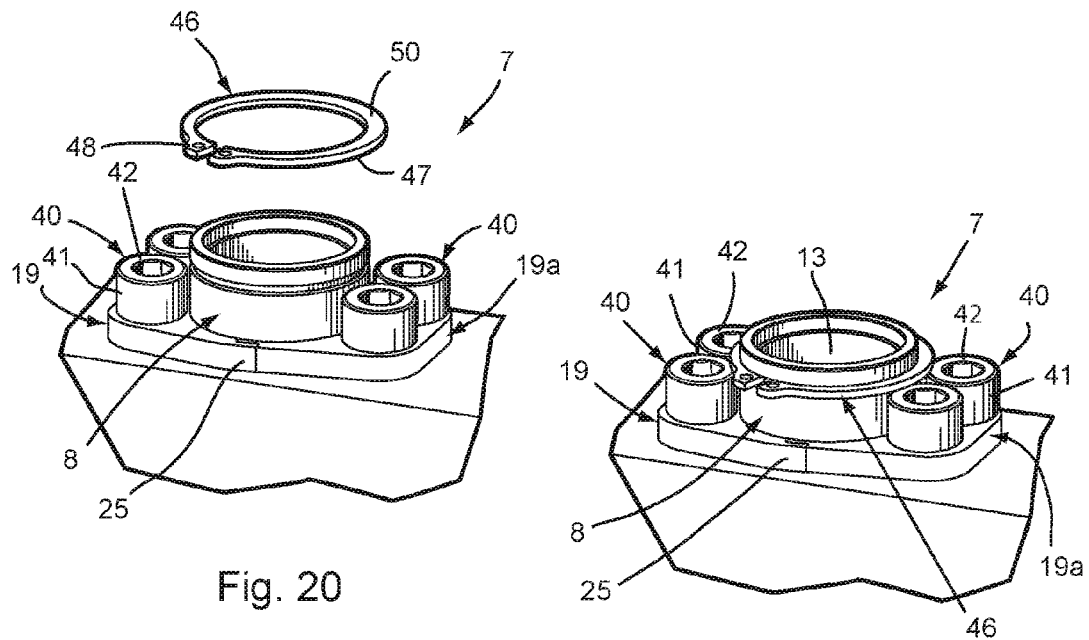
FIG. 20 is a perspective view of the base and die member shown in FIGS. 18 and 20, wherein four mounting screws have been installed to securely, yet detachably, mount the base on the die member.
FIG. 21 is a perspective view of the base and die member shown in FIGS. 18-20, wherein a retainer ring has been placed in the retainer ring groove in the base body, so as to prevent unintentional unfastening of the mounting screws from the die member, and define an assembled condition.
Figure 22:
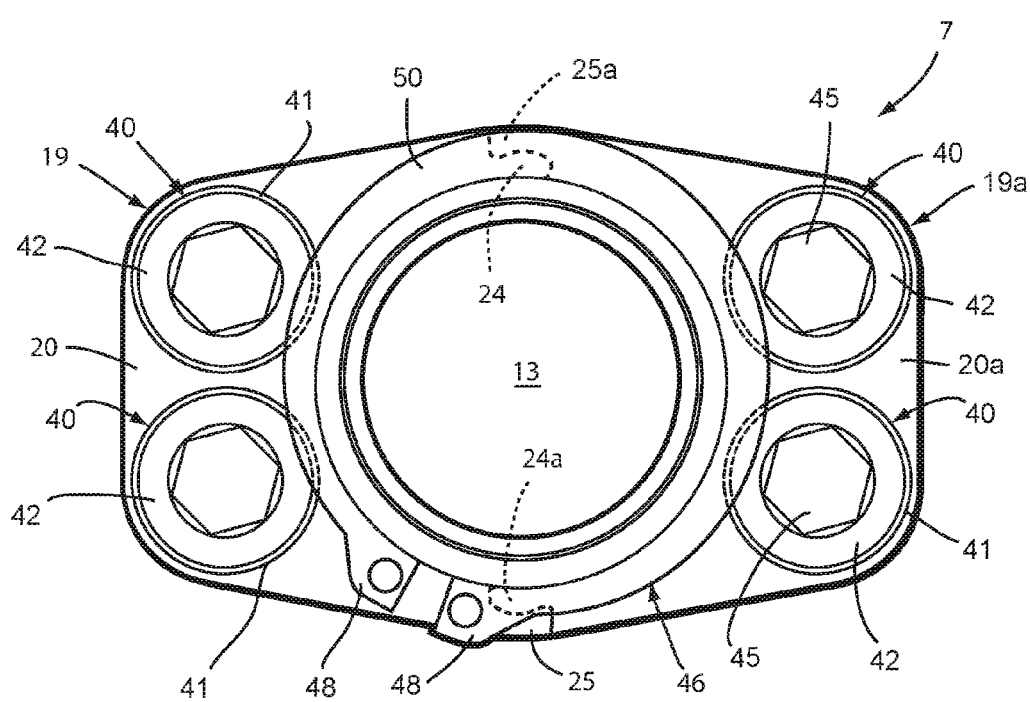
FIG. 22 is an enlarged top plan view of the fully assembled base and die member shown in FIG. 21.
Figure 23:
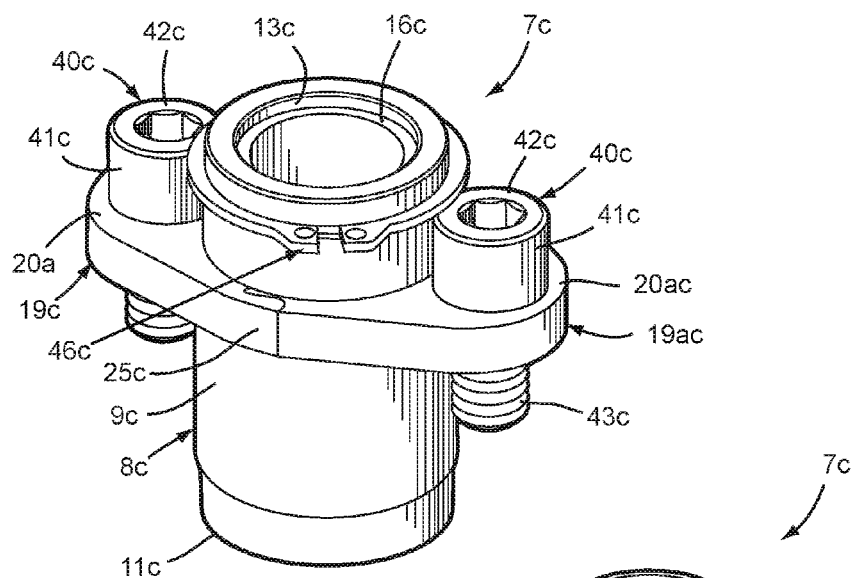
FIG. 23 is a perspective view of another embodiment of the present invention, shown in an assembled condition.
Figure 24:
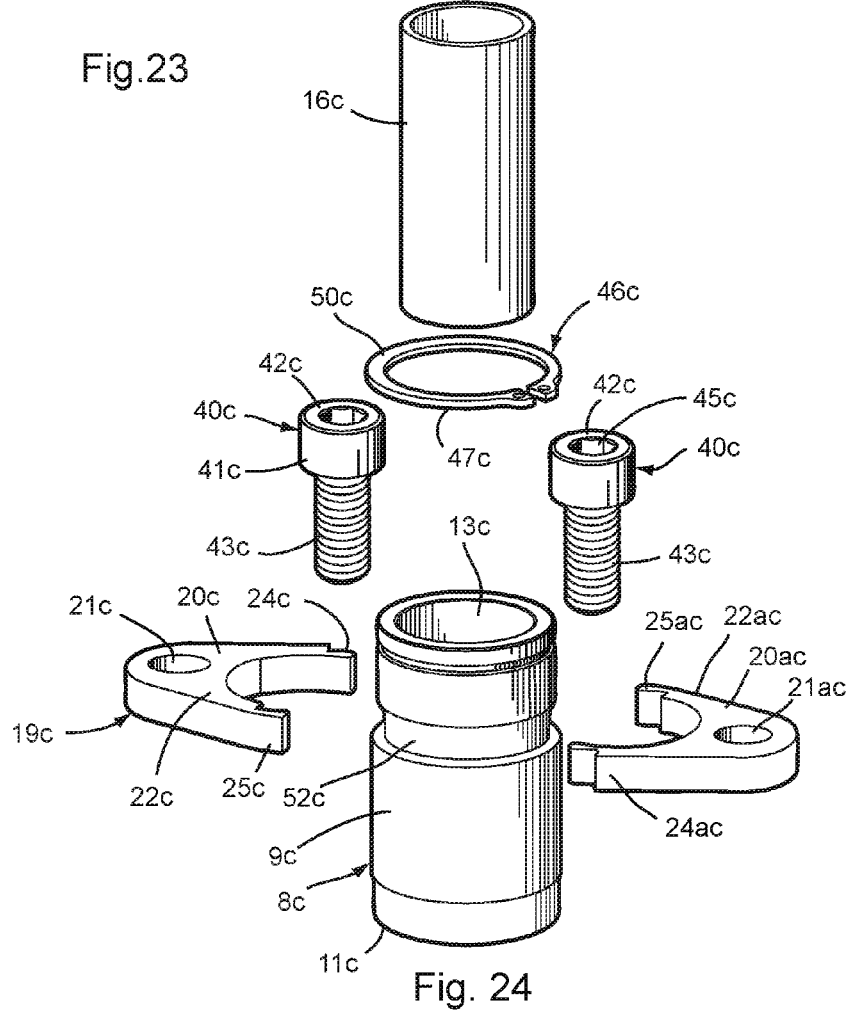
FIG. 24 is an exploded perspective view of the embodiment illustrated in FIG. 23, shown in a disassembled condition.
Figure 25:
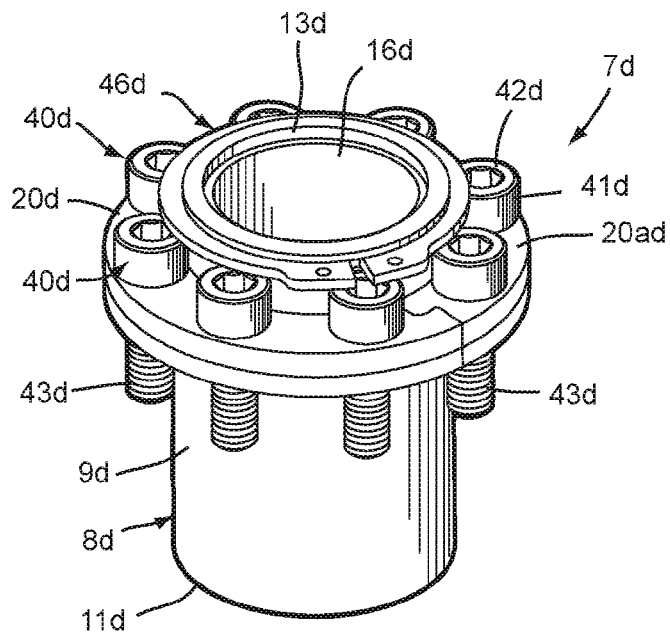
FIG. 25 is a perspective view of yet another embodiment of the present invention, shown in an assembled condition.
Figure 26:
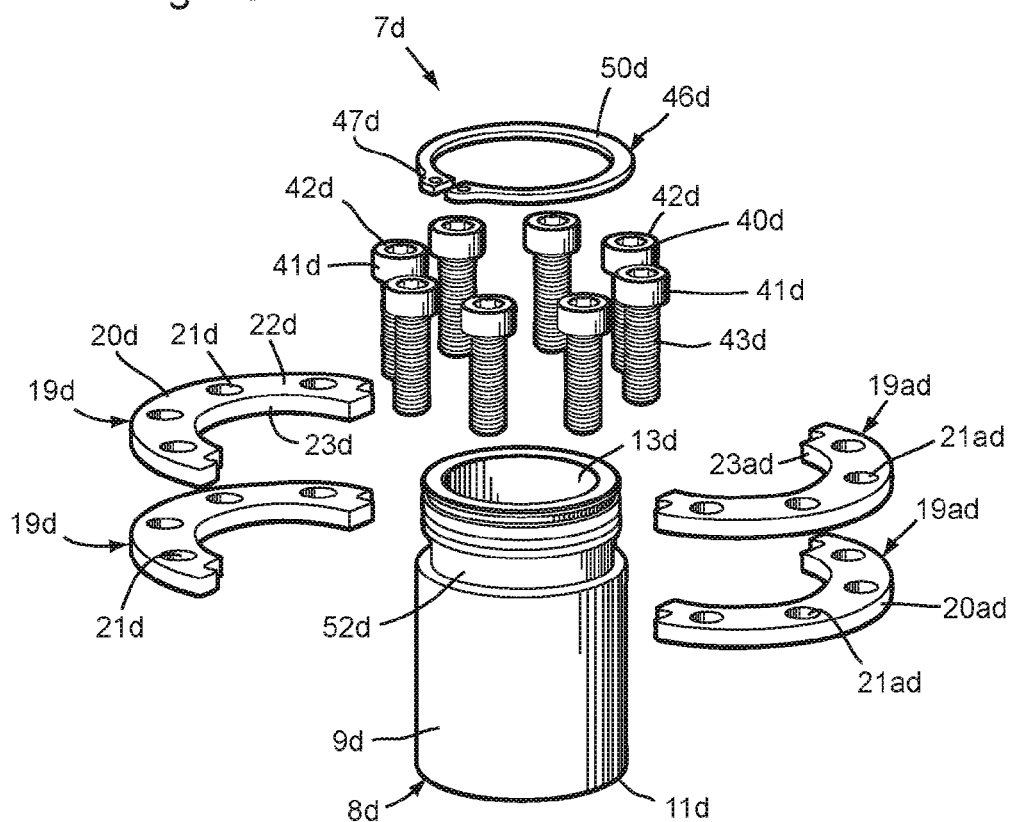
FIG. 26 is an exploded perspective view of the embodiment shown in FIG. 25, shown in a disassembled condition.

In general, base assembly 7 and associated guided keeper assembly 1 are used to support reciprocating parts of a metal forming die. More specifically, as will be readily appreciated by those skilled in the art, base assembly 7, and associated guided keeper assembly 1 are designed to mount a wide variety of different sized and shaped die parts in numerous locations and orientations in any given metal forming die, such as die shoes, die pads, pressure pads, stripper pads, etc. Hence, the term "die member" as used herein, refers to any portion of a metal forming die or die set including, but not limited to, an upper die shoe, a lower die shoe 3, and all other die components. With reference to FIGS. 16-22, the illustrated base assembly 7 is mounted in an associated die member 3 in the following manner. Initially, an unthreaded bore hole 90 (FIG. 18) is formed in the mounting surface 91 of die member 3 at the desired location, and in a shape to closely receive the inner end 11 of base body 8 therein. Four threaded retainer apertures 92 are also formed in the mounting surface 91 of die member 3, parallel with bore hole 90, in a generally rectangular pattern centered about the axial center line of bore 90, and are shaped to receive the shank ends 43 of mounting screws 40 therein. A pair of flange members 19, 19a (FIGS. 16 and 17) is positioned on opposite sides of base body 8a at a location generally aligned with attachment groove 52, as shown in FIGS. 2 and 16, and then converged until the arcuate end edges 23, 23a and end connectors 24, 24a, 25, 25a are received within the attachment groove 52 and snap locked together, so as to securely, yet detachably, retain the base body 8 and the two flange members 19, 19a together as a unitary base subassembly 28, as best shown in FIG. 17, which facilitates mounting the same in die member 3. Next, the base body 8 with attached flange members 19, 19a defining base subassembly 28 is then placed on the mounting surface 91 of die member 3, with the inward end 11 of base body 8 inserted securely within the bore 90 in die member 3, as shown in FIG. 19. The through apertures 21, 21a in the flange members 19, 19a are then centered over the threaded retainer apertures 92 in die member 3. Mounting screws 40 are then inserted through the through holes 21, 21a in flange members 19, 19a and anchored in the retainer apertures 92 in die member 3, until the same are tight, as shown in FIG. 20. Retainer ring 46 is then snapped into the retainer ring groove 14 in base body 8, as shown in FIGS. 20-22, whereby engagement between the exterior end faces 42 of the head portions 41 of the mounting screws 40 and the interior face 47 of retainer ring 46 positively prevents the mounting screws 40 from unintentionally unfastening from the die member 3.

The reference numeral 7c generally designates an alternate base assembly embodying the present invention, that is specifically designed for more light duty applications, and has a dual mounting screw fastening system. Since base assembly 7c is similar to the previously described base assembly 7, similar parts appearing in FIGS. 1-22 and 23-24, respectively, are represented by the same, corresponding reference numeral, except for the suffix "c" in the numerals of the latter. In base assembly 7c, each flange member 19c, 19ac has only through hole 21c, 21ac in the mounting portion 20c, 20ac thereof, and accommodates only one mounting screw 40c therethrough, such that base assembly 7c is attached to an associated die member using only two mounting screws 40c. Otherwise, base assembly 7c is substantially similar to the previously described base assembly 7.

The reference numeral 7d generally designates yet another alternative base assembly embodying the present invention, that is specifically designed for more heavy duty applications, and has four snap-together flange members and eight mounting screws. Since base assembly 7d is similar to the previously described base assembly 7, similar parts appearing in FIGS. 1-22 and 25-26, respectively, are represented by the same, corresponding reference numerals, except for the suffix "d" in the numerals of the latter. In base assembly 7d, the attachment groove 52d on the base body 8d is axially enlarged, so as to receive therein two vertical stacks of flange members 19d, 19ad, on either side of the base body 8d, which provide additional rigidity to the base body 8d when it is attached to an associated die member. Each of the illustrated flange members 19d, 19ad includes four circumferentially spaced apart through holes 21d, 21ad in which four mounting screws 40d are received and served to anchor base assembly 7d in an associated die member. Retainer ring 46d is shaped to cover at least a portion of each of the outer end faces 42d on mounting screw heads 41d, and thereby positively prevent the mounting screws 40d from unintentionally unfastening from the associated die member. Otherwise, base assembly 7d is substantially similar to the previously described base assembly 7.

Each of the base assemblies 7, 7c and 7d, along with the associated guided keeper assemblies, include a base body with snap-on mounting flanges, which provides a very uncomplicated, cost effective design that uses few different parts, and therefore requires less processing and fabrication. The base assemblies 7, 7c and 7d each have a low profile, as well as a small plan footprint which permits use of the same in a wide variety of different locations on an associated die member. Each of the mounting flange pieces have a substantially identical size and shape, and easily snap together about an associated base so that there are no loose parts when the base assembly is mounted on an associated die member. The base assemblies 7, 7c and 7d require no special tooling, and can be easily removed and replaced when necessary.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a metal forming die having first and second die members mounted a spaced apart distance for reciprocation between converged and diverged positions, the improvement of a guided keeper assembly, comprising:
   a base having:
      a generally cylindrically shaped body with an outside wall portion, first and second oppositely disposed end portions, and a central portion with a central aperture extending axially therethrough;
      a retainer ring groove in said outside wall portion and disposed axially between said first and second end portions; and
      a mounting flange groove on said outside wall portion;
   a two-piece, interlocking mounting flange, including:
      a first flange member having a width that is substantially the same as the width of said mounting flange groove, at least one through hole for attaching said first flange member to said first die member, a mounting flange groove profile which matingly engages half of said mounting flange groove on said outside wall portion of said base and axially interconnects said base and said first flange member, and first and second end connectors; and
      a second flange member that is identical to said first flange member having at least one through hole for attaching said second flange member to said first die member, a mounting flange groove profile which matingly engages half of said mounting flange groove on said outside wall portion of said base and axially interconnects said base and said second flange member, and third and fourth end connectors which securely, yet detachably lock with said first and second end connectors on said first flange member to laterally interconnect said first and second flange members with and about said base in an assembled condition to facilitate installing the same in said first die member, wherein when said first and second flange members are interconnected, said mounting flange grooves keep said first and second flange members aligned;
   a guide pin having:
      a cylindrically shaped central portion closely received in said central aperture in said base for precisely guiding reciprocal motion between said first and second die members;
      a first end having an enlarged head shaped to abut said base to positively limit travel between said first and second die members; and
      a second end, positioned generally opposite said first end, and having a locator portion that engages said second die member, and precisely locates said second end of said guide pin on said second die member;
   fasteners extending through said through holes in said first and second flange members and being anchored in said first die member; and
   a retainer ring detachably received and securely retained in said retainer ring groove in said base, and having an interior face disposed over at least a portion of said fasteners, whereby engagement between said fasteners and said retainer ring positively prevents said fasteners from unintentionally unfastening from said first die member.

2. A metal forming die as set forth in claim 1, wherein:
   said mounting flange groove on said base comprises an annular shaped groove which opens radially outwardly and is defined by first and second radially oriented mutually parallel sidewalls spaced axially apart a predetermined distance, and an axially oriented interior end wall disposed generally perpendicular to said first and second sidewalls and extending axially therebetween.

3. A metal forming die as set forth in claim 2, wherein:
   said first flange member comprises a generally flat plate with mutually parallel first and second faces, and includes an outer end portion in which said through hole is disposed, and a generally U-shaped inner end portion with a generally semi-circularly shaped end edge configured for close reception in an adjacent portion of said mounting flange groove in said base and defines said mounting flange groove profile.

4. A metal forming die as set forth in claim 3, wherein:
   said second flange member comprises a generally flat plate with mutually parallel first and second faces, and includes an outer end portion in which said through hole is disposed, and a generally U-shaped inner end portion with a generally semi-circularly shaped end edge configured for close reception in an adjacent portion of said mounting flange groove in said base and defines said mounting flange groove profile.

5. A metal forming die as set forth in claim 4, wherein:
   said first end connector is disposed adjacent a terminal portion of said inner end portion of said first flange member and protrudes circumferentially outwardly therefrom, and has a first finger with a first contoured surface that faces in a first radial direction; and
   said third end connector is disposed adjacent a terminal portion of said inner end portion of said second flange member and protrudes circumferentially outwardly therefrom, and has a third finger with a third contoured surface that mates with said first contoured surface of said first finger on said first end connector and faces in a second radial direction that is radially opposite said first radial direction, whereby convergence of said first and third end connectors causes said first and third end connectors to snap lock together in a self-locking relationship.

6. A metal forming die as set forth in claim 5, wherein:
   said second end connector is disposed adjacent a terminal portion of said inner end portion of said first flange member and protrudes circumferentially outwardly therefrom, and has a second finger with a second contoured surface that faces in a first radial direction; and
   said fourth end connector is disposed adjacent a terminal portion of said inner end portion of said second flange member and protrudes circumferentially outwardly therefrom, and has a fourth finger with a fourth contoured surface that mates with said third contoured surface on said third finger on said third end connector and faces in a second radial direction that is radially opposite said first radial direction, whereby convergence of said second and fourth end connectors causes said second and fourth end connectors to snap lock together in a self-locking relationship.

7. A metal forming die as set forth in claim 1, wherein: said fasteners are detachably anchored in said first die member.

8. A metal forming die as set forth in claim 1, wherein: said retainer ring comprises a split snap ring.

9. A metal forming die as set forth in claim 1, including: an anti-friction bushing mounted in said central aperture of said base and slidingly receiving said central portion of said guide pin therein.

10. A guided keeper assembly for a metal forming die having first and second die members mounted a spaced apart distance for reciprocation between converged and diverged positions, comprising:
a base having:
a generally cylindrically shaped body with an outside wall portion, first and second oppositely disposed end portions, and a central portion with a central aperture extending axially therethrough;
a retainer ring groove in said outside wall portion and disposed axially between said first and second end portions; and
a mounting flange groove on said outside wall portion and disposed axially between said second end portion and said retainer ring groove;
a two-piece, interlocking mounting flange, including:
a first flange member having a width that is substantially the same as the width of said mounting flange groove, at least one through hole for attaching said first flange member to the first die member, an arcuate inside wall portion with a profile which matingly engages half of said mounting flange groove on said outside wall portion of said base and axially interconnects said base and said first flange member, and first and second end connectors; and
a second flange member that is identical to said first flange member having at least one through hole for attaching said second flange member to the first die member, an arcuate inside wall portion with a mounting flange groove profile which matingly engages half of said mounting flange groove on said outside wall portion of said base and axially interconnects said base and said second flange member, and third and fourth end connectors which securely, yet detachably lock with said first and second end connectors on said first flange member to laterally interconnect said first and second flange members with and about said base in an assembled condition to facilitate installing the same in the first die member, wherein when said first and second flange members are interconnected, said mounting flange groove keeps said first and second flange members aligned;
a guide pin having:
a cylindrically shaped central portion closely received in said central aperture in said base for precisely guiding reciprocal motion between the first and second die members;
a first end having an enlarged head shaped to abut said base to positively limit travel between the first and second die members; and
a second end, positioned generally opposite said first end, and having a locator portion that engages the second die member, and precisely locates said second end of said guide pin on the second die member;
fasteners extending through said through holes in said first and second flange members and being adapted for anchoring in the first die member; and
a retainer ring detachably received and securely retained in said retainer ring groove in said base, and having an interior face disposed over at least a portion of said fasteners, whereby engagement between said fasteners and said retainer ring positively prevents said fasteners from unintentionally unfastening from the first die member.

11. A guided keeper assembly as set forth in claim 10, wherein:
said mounting flange groove on said base comprises an annular shaped groove which opens radially outwardly and is defined by first and second radially oriented mutually parallel sidewalls spaced axially apart a predetermined distance, and an axially oriented interior end wall disposed generally perpendicular to said first and second sidewalls and extending axially therebetween.

12. A guided keeper assembly as set forth in claim 10, wherein:
said fasteners are detachably anchored in said first die member.

13. A guided keeper assembly as set forth in claim 12, wherein:
said first end connector is disposed adjacent a terminal portion of said inner end portion of said first flange member and protrudes circumferentially outwardly therefrom, and has a first finger having a first contoured surface that faces in a first radial direction; and
said third end connector is disposed adjacent a terminal portion of said inner end portion of said second flange member and protrudes circumferentially outwardly therefrom, and has a third finger having a third contoured surface that mates with said first contoured surface of said first finger on said first end connector and faces in a second radial direction that is radially opposite said first radial direction, whereby convergence of said first and third end connectors causes said first and third end connectors to snap lock together in a self-locking relationship.

14. A guided keeper assembly as set forth in claim 13, wherein:
said second end connector is disposed adjacent a terminal portion of said inner end portion of said first flange member and protrudes circumferentially outwardly therefrom, and has a second finger having a second contoured surface that faces in a first radial direction; and
said fourth end connector is disposed adjacent a terminal portion of said inner end portion of said second flange member and protrudes circumferentially outwardly therefrom, and has a fourth finger having a fourth contoured surface that mates with said second contoured surface of said second finger on said second end connector and faces in a second radial direction that is radially opposite said first radial direction, whereby convergence of said second and fourth end connectors causes said second and fourth end connectors to snap lock together in a self-locking relationship.

15. A guided keeper assembly as set forth in claim 10, wherein:
said retainer ring comprises a split snap ring.

16. In a method for making a metal forming die having first and second die members mounted a spaced apart distance for reciprocation between converged and diverged positions, comprising:
forming a base with a generally cylindrically shaped body with an outside wall portion, first and second oppositely disposed end portions, and a central portion with a central aperture extending axially therethrough, including:
forming a retainer ring groove in the outside wall portion at a location disposed axially between the first and second end portions; and
forming a mounting flange groove on the outside wall portion at a location disposed axially between the second end portion and the retainer ring groove;
forming a two-piece, interlocking mounting flange, including:
forming a first flange member having a width that is substantially the same as the width of said mounting flange groove, at least one first through hole for attaching the first flange member to the first die member, an arcuate inside wall portion with a profile which is shaped for matingly engaging half of the mounting flange groove on the outside wall portion of the base, and first and second end connectors; and
forming a second flange member that is identical to said first flange member, at least one second through hole for attaching the second flange member to the first die member, an arcuate inside wall portion with a profile which is shaped for matingly engaging half of the mounting flange groove profile on said outside wall portion of the base, and third and fourth end connectors;
forming a guide pin with a cylindrically shaped central portion shaped for close reception in the central aperture in the base for precisely guiding reciprocal motion between the first and second die members, a first end with an enlarged head shaped to abut the base to positively limit travel between the first and second die members, and a second end, positioned generally opposite the first end, with a locator portion that engages the second die member;
forming a non-threaded base aperture in the first die member shaped to closely receive the second end portion of the base therein;
forming retainer apertures in the first die member in a laterally spaced apart relationship on opposite sides of the base aperture;
providing fasteners shaped to extend through the through holes in the first and second flange members;
providing a retainer ring shaped for close reception in the retainer ring groove in the base, and having an interior face;
positioning the first flange member abuttingly against an adjacent portion of half of the mounting flange groove on the base;
positioning the second flange abuttingly against an adjacent portion of half of the mounting flange groove on the base at a location generally diametrically opposite the first flange member;
radially converging the first and second flange members about the base until the first, second, third and fourth end connectors snap lock together, thereby axially interconnecting the base with the first and second flange members in an assembled condition to define a base subassembly that facilitates installing the same on the first die member;
positioning the base subassembly on the first die member with the second end portion of the base closely received in the base aperture in the first die member, and with the through holes in the first and second flange members aligned with the retainer apertures in the first die member;
inserting the fasteners through the through holes in the first and second flange members and into the threaded retainer apertures in the first die member;
inserting the retainer ring into the retainer ring groove in the base with the retainer ring disposed over at least a portion of the fasteners, whereby engagement between the fasteners and the retainer ring positively prevents the fasteners from unintentionally unfastening from the first die member;
inserting the central portion of the guide pin into the central aperture of the base for precisely guiding reciprocal motion between the first and second die members; and
connecting the second end of the guide pin with the second die member.

17. A method as set forth in claim 16, wherein:
said mounting flange groove forming step portion of said base forming step comprises forming an annularly shaped attachment groove in the outside wall portion of the base which opens radially outwardly and is defined by first and second radially oriented mutually parallel sidewalls spaced axially apart a predetermined distance, and an axially oriented interior end wall disposed generally perpendicular to said first and second sidewalls and extending axially therebetween.

18. A method as set forth in claim 17, wherein:
said first flange member forming step includes forming the first flange member from a generally flat plate with mutually parallel first and second faces, an outer end portion in which the first through hole is disposed, and a generally U-shaped inner end portion with a generally semi-circularly shaped end edge configured for close reception in an adjacent portion of the mounting flange groove in the base to define the mounting flange groove profile.

19. A method as set forth in claim 18, wherein:
said second flange member forming step comprises forming the second flange member from a generally flat plate with mutually parallel first and second faces, an outer end portion in which the second through hole is disposed, and a generally U-shaped inner end portion with a generally semi-circularly shaped end edge configured for close reception in an adjacent portion of the mounting flange groove in the base to define the mounting flange groove profile.

20. A method as set forth in claim 16, wherein:
said retainer ring providing step includes providing a split snap ring.

* * * * *